(No Model.)
J. L. DAWES & W. G. WALTER.
DRUGGIST'S SIGN.
No. 383,445. Patented May 29, 1888.
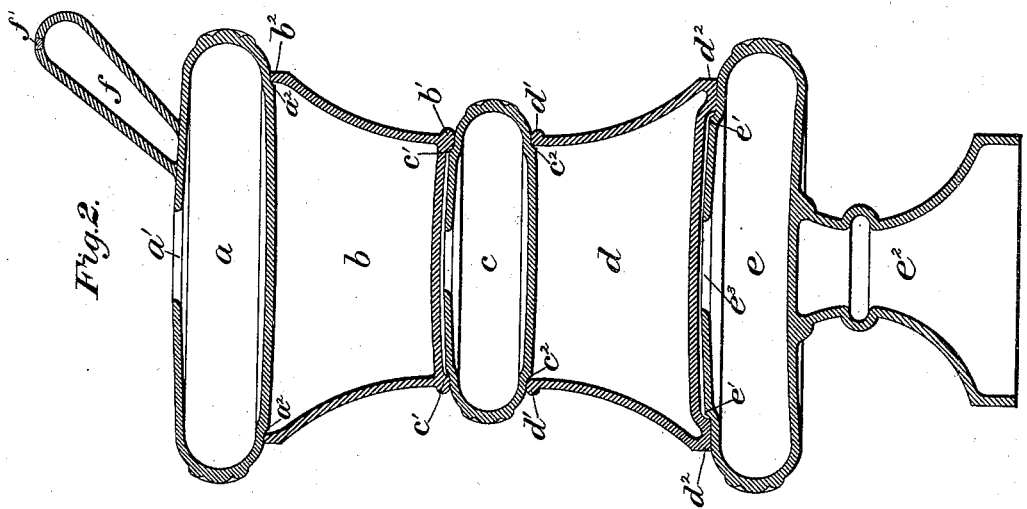
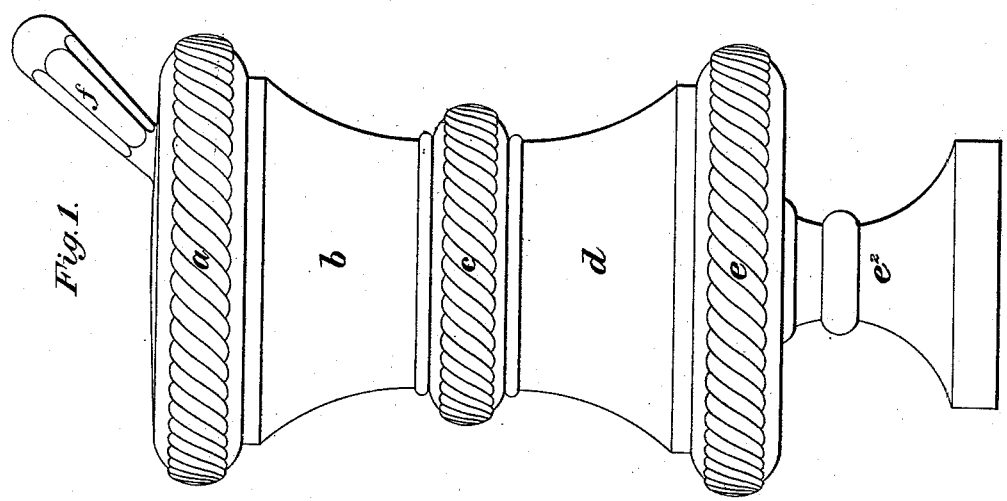
Witnesses.
N. L. Gill.
N. B. Corwin
Inventors.
John L. Dawes,
William G. Walter.
by W. Bakewell & Sons,
their Attorneys.

UNITED STATES PATENT OFFICE.

JOHN L. DAWES AND WILLIAM G. WALTER, OF PITTSBURG, PENNSYLVANIA.

DRUGGIST'S SIGN.

SPECIFICATION forming part of Letters Patent No. 383,445, dated May 29, 1888.

Application filed October 3, 1887. Serial No. 251,257. (No model.)

*To all whom it may concern:*

Be it known that we, JOHN L. DAWES and WILLIAM G. WALTER, of Pittsburg, in the county of Allegheny and State of Pennsylvania, have invented a new and useful Improvement in Druggists' Signs; and we do hereby declare the following to be a full, clear, and exact description thereof, reference being had to the accompanying drawings, forming part of this specification, in which—

Figure 1 is a side elevation of our improved druggist's sign. Fig. 2 is a vertical sectional view of the same.

Our invention relates to an improvement in druggists' signs; and it consists in the construction and arrangement of a series of glass vessels which may be adapted to contain liquids of different colors, and when placed together represent a druggist's mortar and pestle.

We will now describe our invention, so that others skilled in the art may manufacture and use the same.

In the drawings, $a$ represents an annular dish or vessel closed at the bottom, top, and sides, excepting an aperture, $a'$, in the top, which vessel is formed of glass by blowing it in a suitable mold. In the bottom of the vessel $a$ is an offset portion, $a^2$, which forms an annular rim or edge for securing the vessel to the vessel or section next below it. This next vessel or section, $b$, is also formed of glass, open, however, at the top, so that it may be formed of glass by pressing it in a mold without blowing. The sides of this vessel are inclined or slightly curved, and at the base is an annular beading or rim, $b'$, the purpose of which is to engage with an offset in the next succeeding vessel, $c$, the top of the vessel $b$ being provided with a straight rim, $b^2$, which engages with the edges of the offset $a^2$ of the vessel $a$.

Below the vessel $b$ is a vessel, $c$, similar to the vessel $a$, excepting that it is smaller in size and is provided with an offset, $c'$, on its upper surface, which engages with the beading $b'$. Below the vessel $c$ is a vessel, $d$, which is similar to the vessel $b$, excepting that the sides curve outward from the top to the bottom. The upper edge of the vessel $d$ is provided with a beading, $d'$, which engages with the offset $c^2$ in the base of the vessel $c$. The base of the vessel $d$ is provided with an annular rim, $d^2$, which engages with an offset, $e'$, on the top of the stand $e$. This stand $e$ is composed of an upper portion or vessel having an opening, $e^3$, and a pedestal, $e^2$, which may be formed of glass in separate parts and afterward united together.

Extending from the top of the upper vessel, $a$, is a hollow glass pestle, $f$, having an opening, $f'$, adapted to be closed by a suitable stopper. These vessels $a$, $b$, $c$, $d$, $e$, and $f$, having been formed of glass, are filled with differently-colored liquids, and are then placed one upon the other, as shown in the drawings, and, if desired, cemented together, thereby forming a druggist's sign representing a mortar and pestle in different colors.

If desired, the different sections or vessels may be blown or pressed of glass of different colors.

We are aware that druggists' bottles formed of sections and containing liquids of different colors are not new, and we do not desire to claim such vessels, broadly; but,

Having thus described our improvement, what we claim, and desire to secure by Letters Patent, is—

As a new article of manufacture, a druggist's sign composed of several glass vessels whose forms are those of horizontally-divided sections of the sign—namely, one or more vessels, $b$ $d$, forming the body of the sign, and one or more shallower and wider vessels forming ornamental bands or zones of the sign—said vessels being open at the top to permit of the introduction of colored liquids and being provided with interlocking flanges, whereby they are nested together one upon the other, substantially as and for the purposes described.

In testimony whereof we have hereunto set our hands this 24th day of September, A. D. 1887.

JOHN L. DAWES.
WILLIAM G. WALTER.

Witnesses:
F. X. BARR,
JNO. K. SMITH.